(12) United States Patent
Muralitharan et al.

(10) Patent No.: US 8,112,296 B2
(45) Date of Patent: Feb. 7, 2012

(54) MODELING OF JOB PROFILE DATA

(75) Inventors: Caroline Muralitharan, San Jose, CA (US); Maria Theresa Barnes Leon, Fremont, CA (US); Darayush H. Mistry, Sunnyvale, CA (US); Marcelo Andres Vasquez Rico, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1640 days.

(21) Appl. No.: 10/851,310

(22) Filed: May 21, 2004

(65) Prior Publication Data

US 2007/0208578 A1     Sep. 6, 2007

(51) Int. Cl.
    *G06Q 10/00* (2006.01)
(52) U.S. Cl. .......... 705/7.11; 705/1.1
(58) Field of Classification Search .......... 705/1.1, 705/7.11
    See application file for complete search history.

(56) References Cited

U.S. PATENT DOCUMENTS

| | | | |
|---|---|---|---|
| 4,714,995 A | 12/1987 | Materna et al. | 364/200 |
| 5,220,500 A | 6/1993 | Baird et al. | 705/36 R |
| 5,311,438 A | 5/1994 | Sellers et al. | 700/96 |
| 5,349,643 A | 9/1994 | Cox et al. | 380/25 |
| 5,416,917 A | 5/1995 | Adair et al. | 707/203 |
| 5,446,880 A | 8/1995 | Balgeman et al. | 707/9 |
| 5,566,332 A | 10/1996 | Adair et al. | 707/101 |
| 5,646,862 A | 7/1997 | Jolliffe et al. | 703/1 |
| 5,699,527 A | 12/1997 | Davidson | 705/38 |
| 5,708,828 A | 1/1998 | Coleman | 395/785 |
| 5,724,575 A | 3/1998 | Hoover et al. | 707/10 |
| 5,727,158 A | 3/1998 | Bouziane et al. | 709/225 |
| 5,742,588 A | 4/1998 | Thornberg et al. | 370/236 |
| 5,758,355 A | 5/1998 | Buchanan | 707/201 |
| 5,806,075 A | 9/1998 | Jain et al. | 707/201 |
| 5,930,764 A | 7/1999 | Melchione et al. | 705/10 |
| 5,953,710 A | 9/1999 | Fleming | 705/38 |
| 5,970,490 A | 10/1999 | Morgenstern | 707/10 |
| 6,032,136 A | 2/2000 | Brake, Jr. et al. | 705/41 |
| 6,053,947 A | 4/2000 | Parson | 703/14 |
| 6,178,418 B1 | 1/2001 | Singer | 707/3 |
| 6,216,130 B1 | 4/2001 | Hougaard et al. | 707/10 |
| 6,226,649 B1 | 5/2001 | Bodamer et al. | 707/104.1 |
| 6,233,566 B1 | 5/2001 | Levine et al. | 705/36 R |
| 6,236,997 B1 | 5/2001 | Bodamer et al. | 707/10 |
| 6,275,812 B1 | 8/2001 | Haq et al. | 705/11 |
| 6,336,124 B1 | 1/2002 | Alam et al. | 715/523 |
| 6,341,289 B1 | 1/2002 | Burroughs et al. | 707/104.1 |

(Continued)

FOREIGN PATENT DOCUMENTS

JP    2001 256308    9/2001

(Continued)

OTHER PUBLICATIONS

"Fortis Investments Implements Unified Employee Management System Across 12 Countries" (Business Wire, Jul. 2004).*

(Continued)

*Primary Examiner* — Romain Jeanty
*Assistant Examiner* — George H Walker
(74) *Attorney, Agent, or Firm* — Campbell Stephenson LLP

(57) ABSTRACT

A job profile class is defined that represents a job profile and identifies relationships of the job profile with various entities related to the job profile.

17 Claims, 8 Drawing Sheets

U.S. PATENT DOCUMENTS

| | | | |
|---|---|---|---|
| 6,343,275 B1 | 1/2002 | Wong | 705/26 |
| 6,377,952 B1 | 4/2002 | Inohara et al. | 707/101 |
| 6,385,620 B1* | 5/2002 | Kurzius et al. | 707/104.1 |
| 6,434,567 B1 | 8/2002 | De La Huerga | 707/102 |
| 6,463,430 B1 | 10/2002 | Brady et al. | 707/3 |
| 6,556,950 B1 | 4/2003 | Schwenke et al. | 702/183 |
| 6,569,207 B1* | 5/2003 | Sundaresan | 715/234 |
| 6,591,260 B1 | 7/2003 | Schwarzhoff et al. | 702/2 |
| 6,631,382 B1 | 10/2003 | Kouchi et al. | 707/102 |
| 6,668,253 B1 | 12/2003 | Thompson et al. | 707/10 |
| 6,681,223 B1* | 1/2004 | Sundaresan | 1/1 |
| 6,754,679 B2 | 6/2004 | Oheda | 707/201 |
| 6,778,651 B1 | 8/2004 | Jost et al. | 379/201.01 |
| 6,792,431 B2 | 9/2004 | Tamboli et al. | 707/102 |
| 6,826,542 B1 | 11/2004 | Virgin et al. | 705/34 |
| 6,826,568 B2 | 11/2004 | Bernstein et al. | 707/6 |
| 6,828,963 B1 | 12/2004 | Rappoport | 345/419 |
| 6,883,004 B2 | 4/2005 | Bahl et al. | 707/10 |
| 6,889,260 B1 | 5/2005 | Hughes | 709/246 |
| 6,898,783 B1 | 5/2005 | Gupta et al. | 717/105 |
| 6,912,719 B2 | 6/2005 | Elderon et al. | 719/319 |
| 6,944,514 B1 | 9/2005 | Matheson | 700/98 |
| 6,947,947 B2 | 9/2005 | Block et al. | 707/102 |
| 6,961,760 B2* | 11/2005 | Li et al. | 709/219 |
| 6,996,776 B1 | 2/2006 | Makely et al. | 715/207 |
| 7,043,687 B2 | 5/2006 | Knauss et al. | 715/513 |
| 7,093,200 B2* | 8/2006 | Schreiber et al. | 715/835 |
| 7,099,350 B2 | 8/2006 | Peterson | 370/465 |
| 7,111,010 B2 | 9/2006 | Chen | 707/102 |
| 7,111,077 B1 | 9/2006 | Starkovich et al. | 709/246 |
| 7,124,112 B1 | 10/2006 | Guyan et al. | 705/44 |
| 7,133,882 B1 | 11/2006 | Pringle et al. | 1/1 |
| 7,139,766 B2 | 11/2006 | Thomson et al. | 707/101 |
| 7,143,100 B2 | 11/2006 | Carlson et al. | 707/101 |
| 7,162,540 B2* | 1/2007 | Jasen et al. | 709/242 |
| 7,257,594 B2 | 8/2007 | Tamboli et al. | 701/101 |
| 7,257,820 B2* | 8/2007 | Fischer et al. | 719/316 |
| 7,287,041 B2 | 10/2007 | Barnes-Leon et al. | 707/104.1 |
| 7,337,192 B2 | 2/2008 | Stark et al. | 707/104.1 |
| 7,680,818 B1* | 3/2010 | Fan et al. | 707/999.103 |
| 2001/0011245 A1 | 8/2001 | Duhon | 705/38 |
| 2001/0051907 A1 | 12/2001 | Kumar et al. | 705/36 |
| 2002/0007343 A1 | 1/2002 | Oyama et al. | 705/39 |
| 2002/0019765 A1 | 2/2002 | Mann et al. | 705/11 |
| 2002/0023004 A1 | 2/2002 | Hollander et al. | 705/22 |
| 2002/0035431 A1 | 3/2002 | Ell | 702/5 |
| 2002/0035488 A1 | 3/2002 | Aquila et al. | 705/4 |
| 2002/0040313 A1 | 4/2002 | Hunter et al. | 705/9 |
| 2002/0040339 A1 | 4/2002 | Dhar et al. | 705/38 |
| 2002/0085020 A1 | 7/2002 | Carroll, Jr. | 345/700 |
| 2002/0095456 A1 | 7/2002 | Wensheng | 709/203 |
| 2002/0116234 A1 | 8/2002 | Nagasawa | 705/5 |
| 2002/0123983 A1 | 9/2002 | Riley et al. | 707/1 |
| 2002/0138526 A1 | 9/2002 | Lavi | 709/246 |
| 2002/0169867 A1 | 11/2002 | Mann et al. | 709/224 |
| 2002/0174417 A1* | 11/2002 | Sijacic et al. | 717/147 |
| 2002/0178077 A1 | 11/2002 | Katz et al. | 705/26 |
| 2002/0184085 A1 | 12/2002 | Lindia et al. | 705/11 |
| 2002/0184148 A1 | 12/2002 | Kahn et al. | 705/40 |
| 2002/0188513 A1 | 12/2002 | Gil et al. | 705/22 |
| 2002/0188538 A1 | 12/2002 | Robertson et al. | 705/35 |
| 2003/0018502 A1* | 1/2003 | Rodriguez | 705/7 |
| 2003/0023580 A1 | 1/2003 | Braud et al. | 703/3 |
| 2003/0033437 A1* | 2/2003 | Fischer et al. | 709/310 |
| 2003/0051047 A1 | 3/2003 | Horel et al. | 709/237 |
| 2003/0071852 A1 | 4/2003 | Stimac | 345/810 |
| 2003/0088442 A1 | 5/2003 | Michael et al. | 705/3 |
| 2003/0097642 A1 | 5/2003 | Arai et al. | 716/1 |
| 2003/0131018 A1 | 7/2003 | Godoy et al. | 707/104.1 |
| 2003/0163597 A1 | 8/2003 | Hellman et al. | 709/316 |
| 2003/0163603 A1 | 8/2003 | Fry et al. | 709/328 |
| 2003/0229529 A1* | 12/2003 | Mui et al. | 705/8 |
| 2004/0002982 A1* | 1/2004 | Ersek et al. | 707/100 |
| 2004/0015515 A1 | 1/2004 | Beisiegel et al. | 707/103 Y |
| 2004/0034661 A1 | 2/2004 | Barron et al. | 707/104.1 |
| 2004/0039576 A1 | 2/2004 | He et al. | 705/1 |
| 2004/0093351 A1 | 5/2004 | Lee et al. | 707/104.1 |
| 2004/0122826 A1 | 6/2004 | Mackie | 707/100 |
| 2004/0128188 A1 | 7/2004 | Leither et al. | 705/11 |
| 2004/0162773 A1 | 8/2004 | Del Rey et al. | 705/36 |
| 2004/0199536 A1 | 10/2004 | Barnes-Leon et al. | 705/26 |
| 2004/0215503 A1 | 10/2004 | Allpress et al. | 705/11 |
| 2004/0249854 A1 | 12/2004 | Barnes-Leon et al. | 703/103 Y |
| 2005/0021383 A1* | 1/2005 | Fliess et al. | 705/8 |
| 2005/0021391 A1 | 1/2005 | Lu et al. | 705/11 |
| 2005/0091249 A1 | 4/2005 | Hanson et al. | 707/101 |
| 2005/0160361 A1 | 7/2005 | Young | 715/513 |
| 2005/0197880 A1 | 9/2005 | Walsh et al. | 705/8 |
| 2006/0271446 A1 | 11/2006 | Barnes-Leon et al. | 705/26 |
| 2007/0033531 A1 | 2/2007 | Marsh | 715/738 |
| 2007/0203710 A1 | 8/2007 | Habichler et al. | 705/1 |
| 2007/0208577 A1 | 9/2007 | Barnes-Leon et al. | 705/1 |
| 2007/0208878 A1 | 9/2007 | Barnes-Leon et al. | 709/246 |
| 2007/0214020 A1 | 9/2007 | Srinivasan et al. | 705/4 |
| 2007/0214063 A1 | 9/2007 | Kahlon et al. | 705/28 |
| 2007/0214064 A1 | 9/2007 | Kahlon et al. | 705/28 |
| 2007/0214065 A1 | 9/2007 | Kahlon et al. | 705/28 |
| 2007/0225949 A1* | 9/2007 | Sundararajan et al. | 703/2 |
| 2007/0226037 A1 | 9/2007 | Garg et al. | 705/1 |
| 2007/0226049 A1 | 9/2007 | Muralitharan et al. | 705/11 |
| 2007/0226093 A1 | 9/2007 | Chan et al. | 705/38 |
| 2007/0250408 A1 | 10/2007 | Barnes-Leon et al. | 707/100 |
| 2007/0250419 A1 | 10/2007 | Kumar et al. | 705/34 |
| 2007/0265944 A1 | 11/2007 | Catahan, Jr. et al. | 705/30 |

FOREIGN PATENT DOCUMENTS

| | | |
|---|---|---|
| WO | WO 0143031 A1 | 6/2001 |
| WO | WO 01/88759 A1 | 11/2001 |
| WO | WO 03/003641 A2 | 1/2003 |

OTHER PUBLICATIONS

"Fortis Investments Implements Unified Employee Management System Across 12 Countries" (Business Wire, Jul. 2004).*

Cover Pages "Siebel's Universal Application Network" Apr. 8, 2002 downloaded from xml.coverpages.org May 6, 2010.*

Cover Pages "Siebel Announces Success with Universal Application Network (UAN)" Apr. 21, 2004 downloaded from xml.coverpages.org May 6, 2010.*

Michael Kay, Editor "XSL Transformations (XSLT) Version 2.0 W3C Working Draft May 2, 2003" downloaded from http://www.w3.org/TR/2003/WD-xslt20-20030502/ May 6, 2010.*

Eric Gropp "Transforming XML Schemas" Jan. 15, 2003, downloaded from xml.com May 6, 2010.*

Sonic Software Corporation.Power Schemas With Stylus Studio™ Jan. 2004.*

Maria Seminerio. "Job agencies will hire HR-XML—Protocol promises a lingua franca for resumes." eWeek; Jan. 1, 2001, vol. 18 Issue 1, p. 45.*

Anonymous. "HR-XML Consortium Sponsors Panel Discussion/Demonstrates Draft Protocol at IHRIM Conference and Expo." Business Wire,Jun. 28, 2000.*

Anonymous. "CambridgeDocs releases xDoc XML converter." Information Today; Mar. 1, 2003, vol. 20 Issue 3, p. 49.*

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

Hardwick, Martin, David L. Spooner, Rom Rando, and K.C. Morris, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage entriched information across product development, sales and service; Combination of Siebel eBusiness Applications and PTC Collaborative Product Development solutions to deliver competitive advantage, M2 Presswire, Conventry: Jan. 24, 2002, 3 pages (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group; "Guidelines for using XML for Electronic Data Interchange." Presented at XML One—San Jose, Sep./Oct. 2001. 'The eBusiness framework'; Downloaded from http://web.archive.org/web/20040413182700/http://www.xmledi-group.org/; 3 pages.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp? and http://www.w3.schools.com/Schema/schema_complex_empty.asp?;7 pages.

Routledge et al., UML and XML Schema, 2002, pp. 1-10.

Walter J. Savitch, Java an Introduction to Computer Science & Programming, 2000, p. 478.

Walter J. Savitch, Java an Introduction to Computer Science & Programming, 2000, pp. 458-467.

Walter J. Savitch, Java an Introduction to Computer Science & Programming, 2000, p. 1.

"Extract simplifies file conversion" Software Markets, Dec. 2, 1991. Retrieved via Dialog on Aug. 16, 2010.

* cited by examiner

US 8,112,296 B2

MODELING OF JOB PROFILE DATA

FIELD OF THE INVENTION

This invention relates generally to data modeling, and more particularly to modeling of job profile data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2004, Siebel Systems, Inc., All Rights Reserved.

BACKGROUND OF THE INVENTION

Employee Relationship Management (ERM) is a critical business process that enables a company's employees to do their job better. In particular, ERM allows a company to better manage relationships with its workforce and to improve the working practices and effectiveness of the workforce. Typically, an ERM system of a company maintains a variety of information associated with employees, including information identifying job profiles of employees. Job profile information may be used within a company for hiring, promotion, training and planning. In addition, job profile information may need to be transferred to outside companies such as hiring agencies, training providers, etc.

Currently, no software product exists that allows various systems maintained by an organization (e.g., a Human Resource Management System (HRMS), an ERM, etc.) to share data on employee job profiles. This creates difficulties in collaboration between different divisions of an organization and impedes successful hiring and training processes within the organization.

SUMMARY OF THE INVENTION

The present invention relates to various aspects for modeling job profile data.

According to one aspect of the present invention, a job profile class is defined that represents a job profile and identifies relationships of a job profile with various entities related to the job profile.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
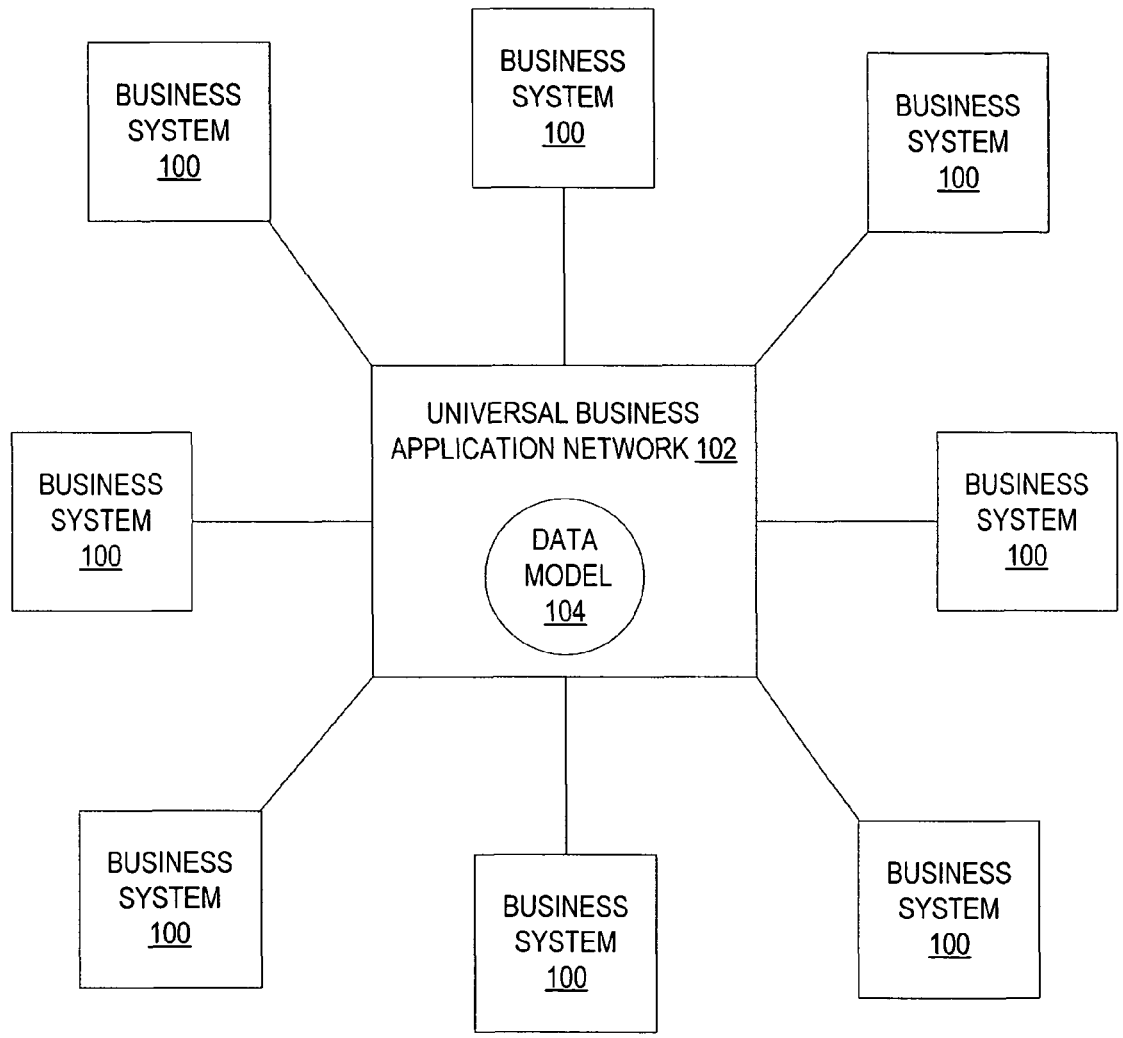
FIG. 1 is a block diagram illustrating the interconnection between various business systems and a universal business application network, according to one embodiment of the present invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

A data model that provides a common data structure to represent a job profile and allows for customization of the data model in a manner that facilitates upgrading of the data model is described. A job profile refers to a description of responsibilities and skills associated with a particular position of an individual (e.g., an employee, a consultant, a contractor, etc.) within an organization. Job profile data may be used, for example, for hiring, promotion, planning, and training. Job profile data may need to be accessible to various applications and systems within a company (e.g., a Human Resource Management System (HRM) system, an Employee Relationship Management (ERM) system, custom software applications, etc.). In addition, job profile data may need to be accessible to applications and systems of outside entities (e.g., a hiring agency, a consulting company, etc.).

In one embodiment, the job profile data model defines relationships of a job profile with various entities related to the job profile. These entities may include, for example, related work positions (jobs associated with the job profile), related skills (skills required for the job profile), etc.

The data model models the relationships as attributes associated with a job profile. In one embodiment, the job profile data model is specified using a schema language such as XML Schema.

In one embodiment, the data model defines a hierarchy of the data elements for describing a job profile. The data model may define data elements that are complex. A complex data element is a data element that comprises data sub-elements. For example, an address data element may be a complex data element that includes street, city, and state data sub-elements. The data model may specify custom data elements at various places within the hierarchy of data elements. A custom data element is of a custom data element type. The custom data element type initially defines no data elements. The data model can be customized by defining custom data elements that are specific to different applications or systems. Because the custom data elements are defined at various places within the hierarchy, the customizations of the data model can be associated with related data elements within the hierarchy.

Thus, the job profile data model provides a common data structure for interfacing job profile data of various divisions within an organization and/or job profile data of an organization and collaborating third parties, while allowing for simplified customization of this data structure by individual divisions and/or companies in accordance with their needs. Hence, the job profile data model allows companies to maintain, support and upgrade only a single data model and facilitates efficient data transformations and mappings.

FIG. 1 is a block diagram illustrating the interconnection between various business systems 100 (business systems utilizing job profile related data) and a universal business application network 102, according to one embodiment of the present invention. The universal business application network 100 serves as an integration hub for the business systems 100. The architecture of the universal business application network 102 allows new applications (e.g., Human Resources Management (HRM) applications and Employee Relationship Management (ERM) applications) that access legacy business systems to be developed with minimum customization. The legacy business systems can be provided by a single business organization or by different business organizations. The universal business application network 102 allows the HRM and ERM applications to exchange information using a job profile data model 104.

In one embodiment, the job profile data model 104 defines a hierarchical data structure representing a job profile. This hierarchical data structure includes data elements that are common to all business systems 100. In addition, the hierarchical data structure includes custom data elements at various levels of the hierarchy to define data fields that are specific to each business system 100, thus providing for easy customization of the job profile data model 104.

In one embodiment, the universal business application network 102 uses the XML and Web services standards.

Figure 2:
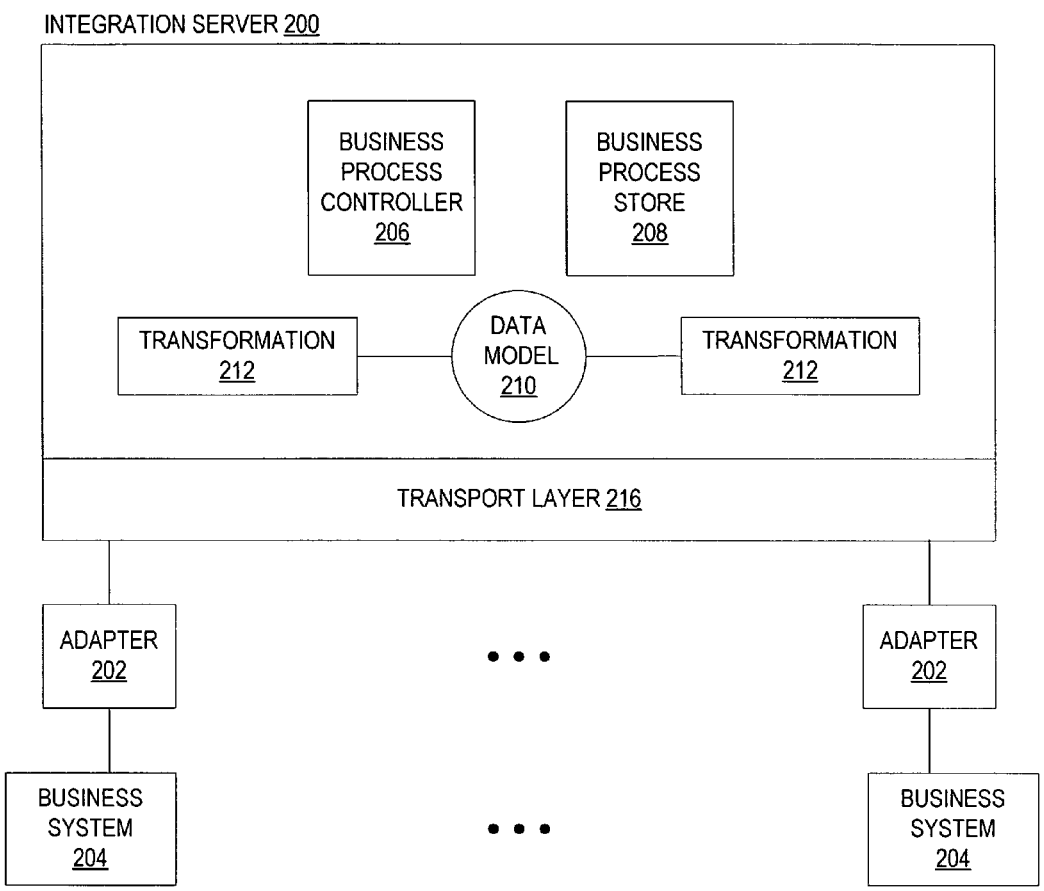
FIG. 2 is a block diagram illustrating the overall architecture of a universal business application network, according to one embodiment of the present invention.

FIG. 2 is a block diagram illustrating the overall architecture of a universal business application network in one embodiment. The hub of the universal business application network is an integration server 200 that connects to the various business systems 204 (e.g., business systems utilizing job profile related data) via adapters 202. The integration server 200 includes a transport layer 216, a data model 210, a transformation store 214, a business process controller 206, and a business process store 208.

The transport layer 216 is a mechanism through which business information is exchanged between the business systems 204 and the business integration server 200. Each business system 204 may have an adapter 202 that is appropriate to the protocol of the transport layer. For example, the transport mechanism may use communications protocols such as TCP/IP. The transport layer 216 may provide a messaging service for queuing, for guaranteeing delivery of messages, and for handling both synchronous and asynchronous messaging. The adapters 202 relay events from the business systems 204 to the integration server 200 and can import configurations of the business systems 204 into the integration server 200. In addition, the universal business application network may include encryption and authentication mechanisms to ensure the security and integrity of the information. For example, authentication will help ensure that a business process is accessing the intended business system, rather than an impostor business system.

The integration server 200 stores the representation of a data model 210 (e.g., in an XML schema file) that contains the definition of a job profile class. The job profile class represents a job profile and defines relationships of the job profile with various related entities.

The transformation store 212 contains a model data definition tool (e.g., an XML schema definition tool) to create a definition of the data model 210 (e.g., in an XML schema file) and to customize the data model 210 when requested by adding custom data fields to the data model 210. The transformation store 212 also contains transformations for transforming information received from the business systems 204 to the format used by the data model 210, and vice versa. The transformations may be specified as a computer program, an XML Stylesheet Language Transform (XSLT), etc.

The business process store 208 contains the business processes that have been defined. A business process may be specified as a script, a process flow, an executable program, etc. In one embodiment, the business processes are defined using the Web Services Flow Language (OOWSFL). The business processes orchestrate a sequence of steps across multiple applications provided by the business systems 204 to achieve a business objective.

The business process controller 206 coordinates the execution of the business processes. The business process controller 206 may instantiate the job profile class and invoke functions of the resulting object in accordance with the various business processes. The business process controller 206 may also initiate the execution of business processes based on predefined conditions and events. For example, the business process controller 206 may launch a certain business process each time an alert is received. Although not shown, the business integration network may provide a standard library of business routines that may be invoked by the business processes. The integration server 200 may also include various tools to facilitate the development of business processes. These tools may aid in the development of transformations, the defining of classes, and the writing of process flows.

Figure 3:
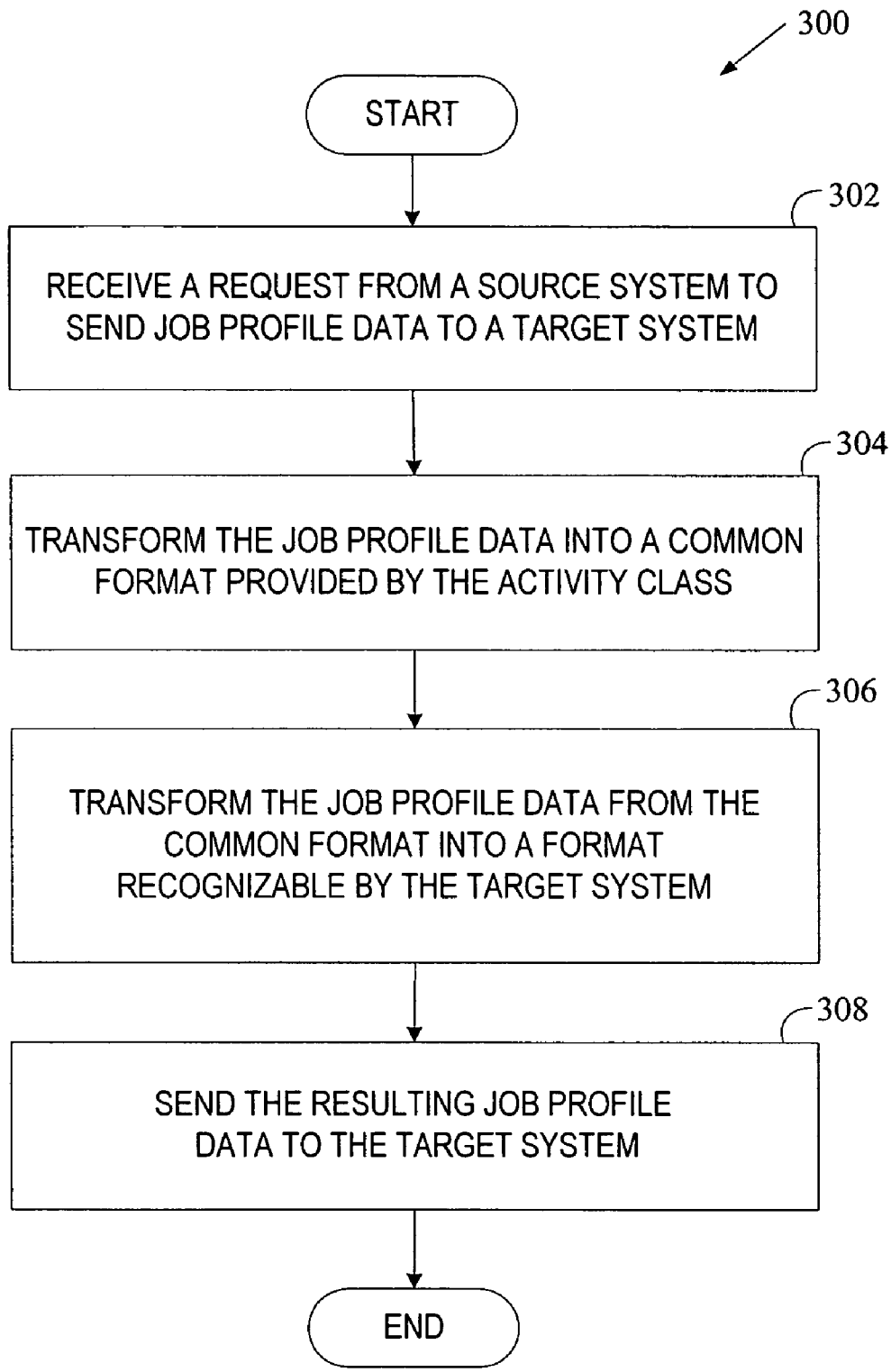
FIG. 3 is a flow diagram of one embodiment of a process for facilitating the sharing of job profile data between two applications.

FIG. 3 is a flow diagram of one embodiment of a process 300 for facilitating the sharing of job profile data between two applications utilizing job profile data. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

Referring to FIG. 3, process 300 begins with processing logic receiving a request from a source system to send job profile data to a target system (processing block 302). For example, job profile data may pertain to a position within a computer company, a source system may be an HRM or ERM application used by the computer company, and a target system may be a HRM or ERM application used by a recruiter seeking candidates for a position within the computer company. In another example, job profile data may pertain to a position within a company, a source system may be an HRM application used by the company, and a target system may be an ERM application used by the company.

Next, processing logic transforms the job profile data into a common format provided by the job profile class (processing block 304). The job profile class defines relationships of a job profile with various entities related to the job profile. These entities may include, for example, related work positions (jobs associated with the job profile), related skills (skills required for the job profile), etc.

Further, processing logic transforms the job profile data from the common format into a format recognizable by the target system (processing block 306) and sends the resulting job profile data to the target system (processing block 308).

Thus, according to the process 300, the sharing of job profile data between two systems does not require data mapping between the data format of the source application and the data format of the target application. Instead, the mapping is performed between each system and the common data model. Furthermore, the process 300 allows various divisions and/or organizations to share the job profile data in a manner that allows access to up-to-date job profile information by all participating parties, thus facilitating collaboration between parties participating in HRM and ERM processes.

As discussed above, in one embodiment, each class of the job profile data model can be customized for a specific business system or application.

Figure 4:
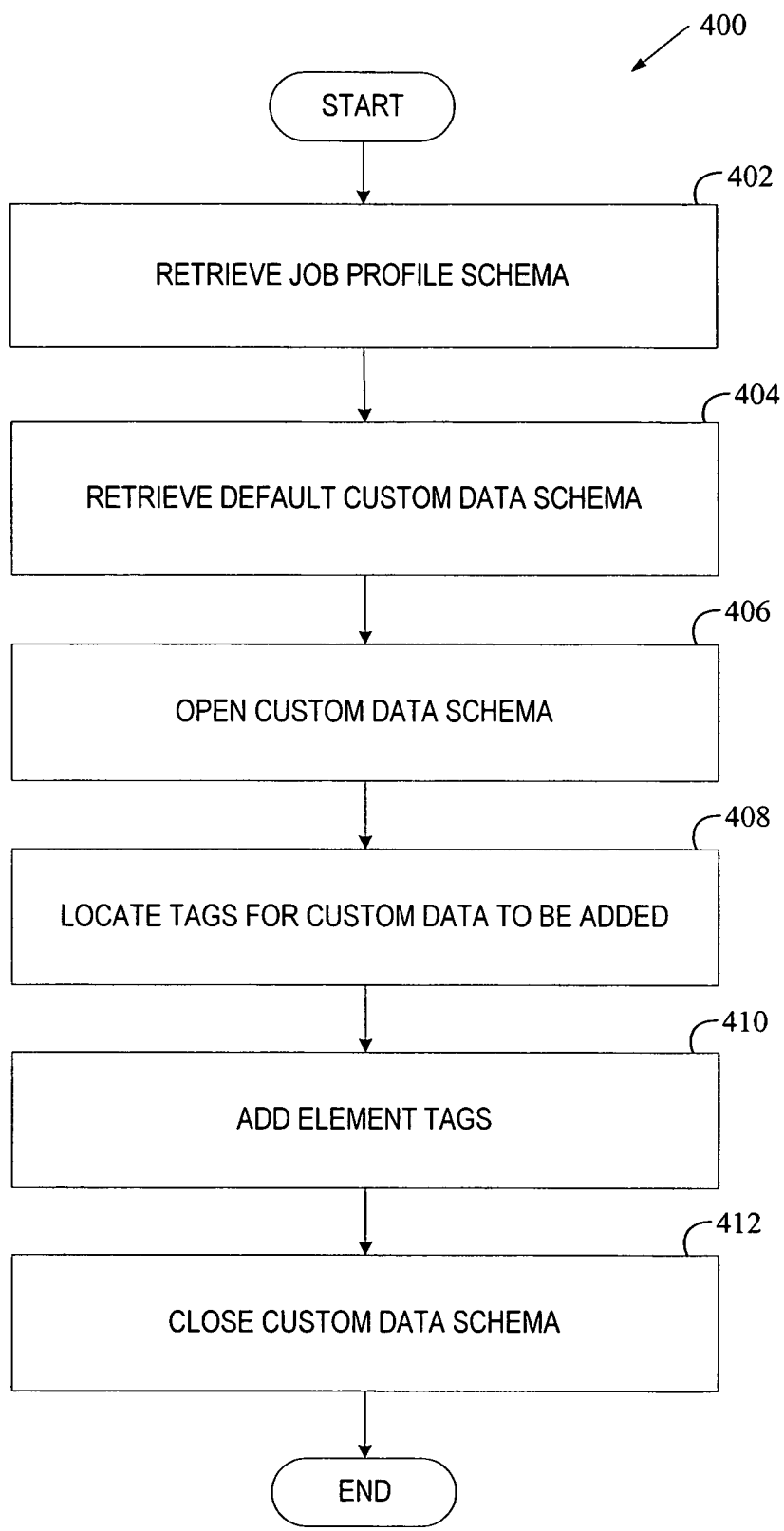
FIG. 4 is a flow diagram of one embodiment of a process for adding custom data to a job profile class.

FIG. 4 is a flow diagram of one embodiment of a process for adding custom data to job profile class. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

At processing block 402, processing logic retrieves a data definition schema for the job profile class. The schema may be an XML schema file that include a custom data element of a type that is defined in another file.

At processing block 404, processing logic retrieves the custom data schema for the types of custom data. The schema may be stored in an XML schema file that contains the definition for each type of custom data.

Next, processing logic opens the custom data schema (processing block 406) and locates the tags relating to the custom data type of interest (processing block 408).

Further, processing logic adds the custom data elements to the located tags (processing block 410) and closes the custom data schema with the newly defined data elements (processing block 412).

One embodiment of a common data model representing a job profile will now be described in more detail in conjunction with FIGS. 5-8. One skilled in the art will appreciate that various other common data models representing job profile can be used with the present invention without loss of generality. In addition, the names of data elements illustrated in FIGS. 5-8 are descriptive of the information stored in the data elements.

Figure 5:
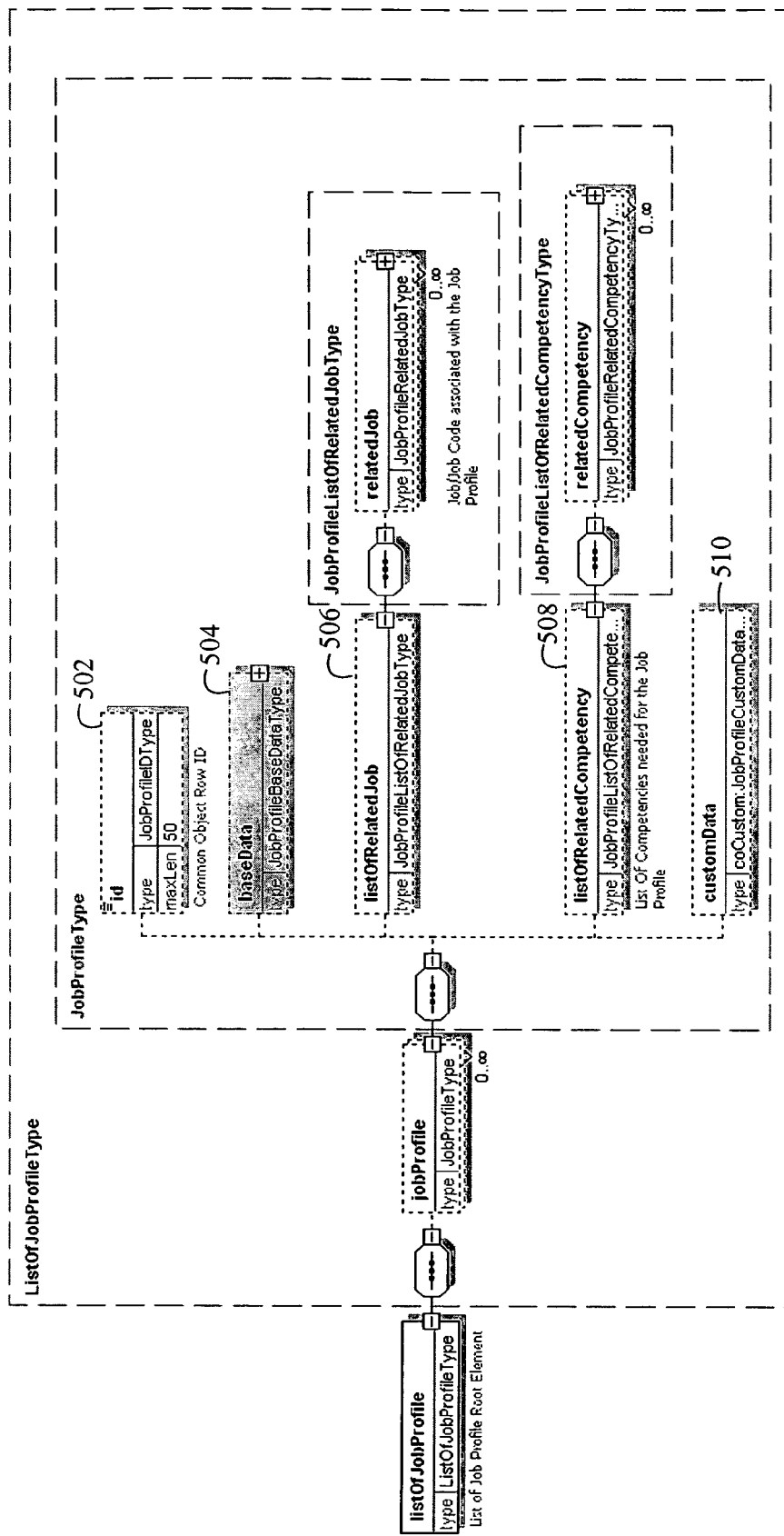
FIGS. 5-8 illustrate one embodiment of a common data model representing a job profile.

FIG. 5 illustrates the listOfJobProfile data elements of the job profile class in one embodiment. The listOfJobProfile data elements include id 502, baseData 504, listOfRelatedJob 506, listOfRelatedCompetency 508, and customData 510.

The id data element 502 may be a unique identifier of a job profile. The baseData data element 504 contains general information pertaining to the job profile, as will be discussed in more detail below in conjunction with FIG. 6. The listOfRelatedJob data element 506 identifies a list of jobs associated with the job profile, as will be discussed in more detail below in conjunction with FIG. 7. The listOfRelatedCompetency data element 508 contains information on the skills associated with the job profile, as will be discussed in more detail below in conjunction with FIG. 8. The customData data element 510 initially contains no data elements, but custom data elements can be added by defining data elements in the JobProfileCustomDataType.

Figure 6:
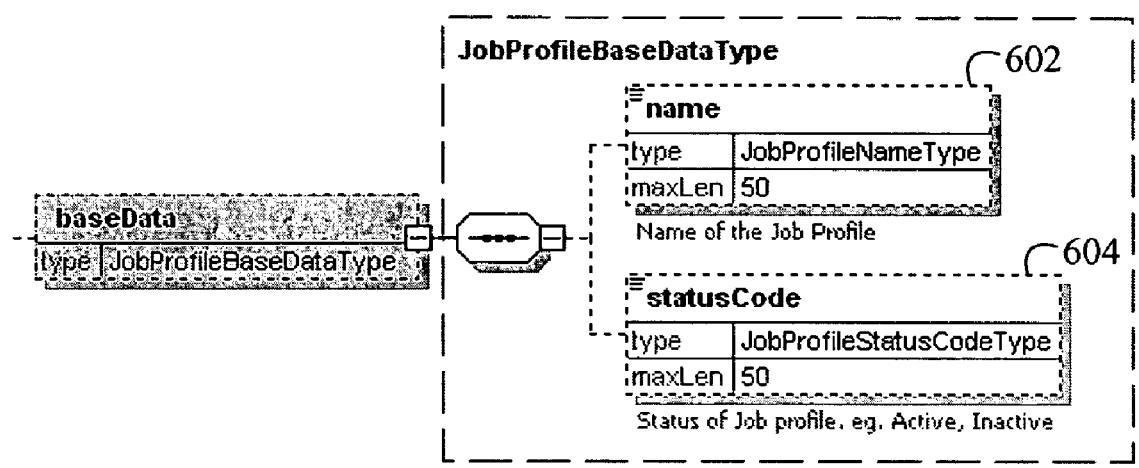

FIG. 6 illustrates the data elements of the baseData class in one embodiment. The data elements of the baseData class include name 602 and statusCode 604. The name data element 602 specifies the name of the job profile. The statusCode data element 604 identifies the status of the job profile (e.g., active or inactive).

Figure 7:
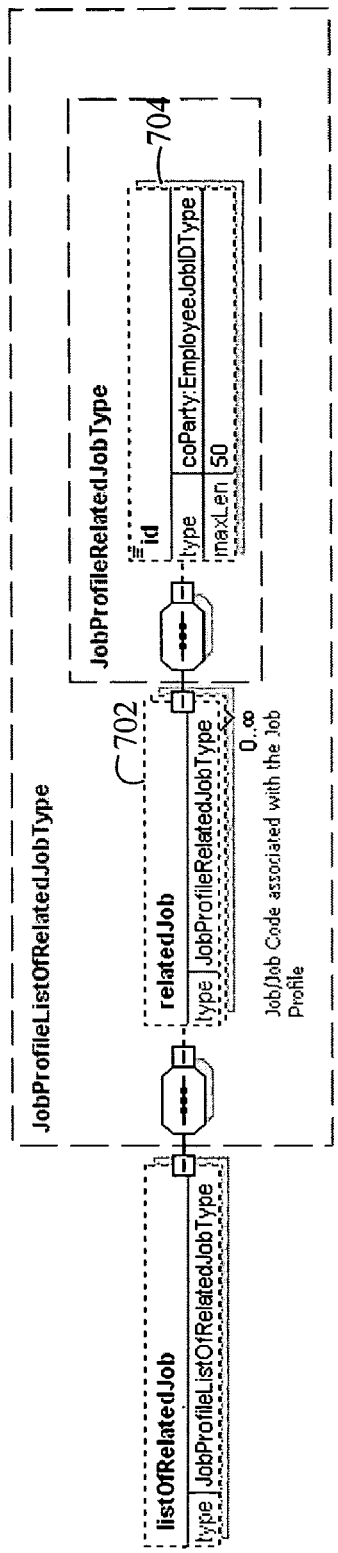

FIG. 7 illustrates the data element of the listOfRelatedJob class in one embodiment. The data element includes relatedJob 702, which references the JobProfileRelatedJobType class that includes id data element 704 identifying a job code for the job profile.

Figure 8:
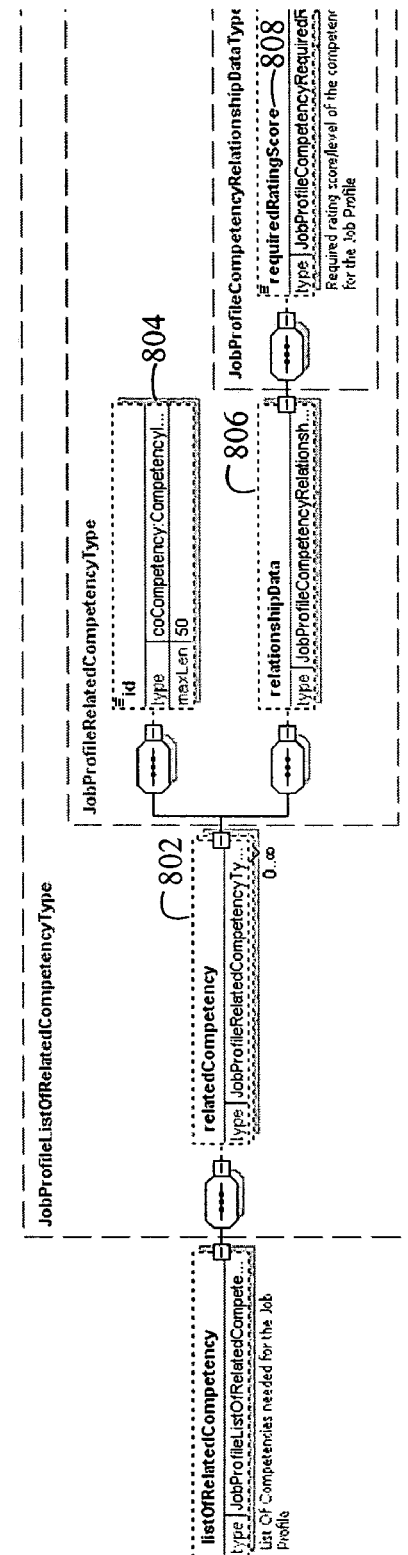

FIG. 8 illustrates the data element of the listOfRelatedCompetency class in one embodiment. The listOfRelatedCompetency data element includes listOfRelatedCompetency 802, which references the JobProfileRelatedCompetencyType class that includes id data element 804 providing an identifier of a skill and a relationshipData data element 806. The relationshipData data element 806 references the JobProfileCompetencyRelationshipData class that includes a requiredRatingScore data element 808 identifying a required rating score or level of competency for the job profile.

Figure 9:
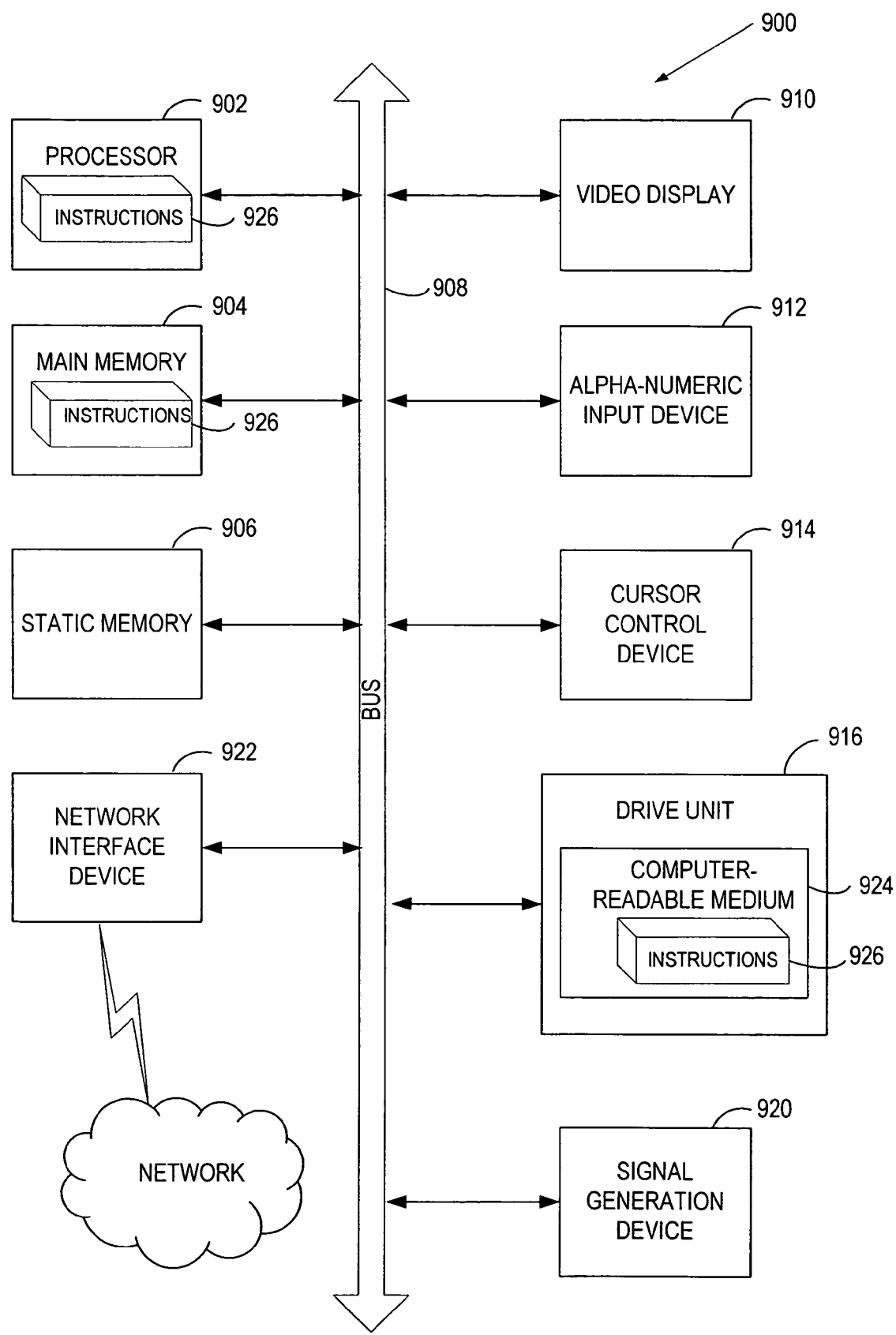
FIG. 9 is a block diagram of an exemplary computer system that may be used to perform one or more of the operations described herein.

FIG. 9 is a block diagram of an exemplary computer system 900 (e.g., of the integration server 200 of FIG. 2) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 920 (e.g., a speaker) and a network interface device 922.

The disk drive unit 916 includes a computer-readable medium 924 on which is stored a set of instructions (i.e., software) 926 embodying any one, or all, of the methodologies described above. The software 926 is also shown to reside, completely or at least partially, within the main memory 904 and/or within the processor 902. The software 926 may further be transmitted or received via the network interface device 922. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer-implemented method for data transformation, implemented in a computer system, the method comprising:
   storing, on a memory device coupled to a processor of a computer system, a business process, wherein
      the business process is an executable program,
      the business process is configured to control a plurality of business applications, and
      the plurality of business applications includes at least one of a source application or a target application;
   receiving job profile data, wherein
      the job profile data is received from the source application, and
      the job profile data is received in a source format;
   transforming, using the processor of the computer system, the job profile data from the source format into a common format, wherein
      the transforming the job profile data into a common format uses a job profile object,
      the common format is defined by a job profile class,
      the job profile class is configured to
         represent a job profile, and
         identify a set of relationships between the job profile and a plurality of entities, and
      the entities are related to the job profile, and
      the transforming the job profile data into a common format comprises
         creating the job profile object by instantiating the job profile class, and
         invoking a function of the job profile object in accordance with the business process;
   transforming the job profile data from the common format into a target format of the target application, wherein
      the transforming the job profile data from the common format uses the job profile object;
   sending the job profile data in the target format to the target application; and
   adding a custom data element to the job profile class by
      retrieving a data definition schema associated with the job profile class,
         wherein
         the data definition schema comprises the custom data element, retrieving a custom data schema for custom data of a pre-defined type, locating a tag related to the custom data in the custom data schema, and adding the custom data element to the tag.

2. The computer-implemented method of claim 1, further comprising:
   defining the job profile class.

3. The computer-implemented method of claim 2, wherein the entities comprise at least one of
   a related work position, and
   a related skill.

4. The computer-implemented method of claim 1, wherein the custom data element of the job profile class is associated with at least one data field specific to the source application.

5. The computer-implemented method of claim 2, further comprising:
   initializing data elements of the job profile object.

6. The computer-implemented method of claim 2, wherein a definition of the job profile class is represented as an XML schema.

7. A computer program product comprising:
   a plurality of instructions, comprising
      a first set of instructions, executable on the computer system, configured to store a business process, wherein
         the business process is an executable program,
         the business process is configured to control a plurality of business applications, and
         the plurality of business applications includes at least one of a source application or a target application,
      a second set of instructions, executable on a computer system, configured to receive job profile data, wherein
         the job profile data is received from the source application, and
         the job profile data is received in a source format,
      a third set of instructions, executable on the computer system, configured to transform the job profile data from the source format into a common format, wherein
         the third set of instructions is further configured to transform the job profile data into the common format using a job profile object,
         the common format is defined by a job profile class,
         the job profile class is configured to represent a job profile, and identify a set of relationships between the job profile and a plurality of entities, and the entities are related to the job profile, and the third set of instructions is further configured to transform the job profile data into the common format by creating the job profile object by instantiating the job profile class, and invoking a function of the job profile object in accordance with the business process, a fourth set of instructions, executable on the computer system, configured to transform the job profile data from the common format into a target format of the target application, wherein the fourth set of instructions is configured to transform the job profile data from the common format using the job profile object, a fifth set of instructions, executable on the computer system, configured to send the job profile data in the target format to the target application, and a sixth set of instructions, executable on the computer system, configured to add a custom data element to the job profile class by retrieving a data definition schema associated with the job profile class, wherein the data definition schema comprises the custom data element, retrieving a custom data schema for custom data of a pre-defined type, locating a tag related to the custom data in the custom data schema, and adding the custom data element to the tag; and a computer-readable storage medium, wherein the instructions are encoded in the computer-readable storage medium.

8. The computer program product of claim 7, wherein the instructions further comprise:

a seventh set of instructions, executable on the computer system, configured to define the job profile class.

9. The computer program product of claim 8, wherein the entities comprise at least one of a related work position, and a related skill.

10. The computer program product of claim 7, wherein the instructions further comprise:

a seventh set of instructions, executable on the computer system, configured to initialize data elements of the job profile object.

11. A system comprising:

a memory; and a processor, wherein the processor is coupled to the memory, the processor is configured to execute a set of instructions, and the set of instructions is configured to cause the processor to store a business process, wherein the business process is an executable program, the business process is configured to control a plurality of business applications, and the plurality of business applications includes at least one of a source application or a target application, receive job profile data, wherein the job profile data is received from the source application, transform the job profile data from the source format into a common format, wherein the transforming the job profile data into a common format uses a job profile object, the common format is defined by a job profile class, the job profile class is configured to represent a job profile, and identify a set of relationships between the job profile and a plurality of entities, and the entities are related to the job profile, and the transforming the job profile data into a common format comprises creating the job profile object by instantiating the job profile class, and invoking a function of the job profile object in accordance with the business process, transform the job profile data from the common format into a target format of the target application, wherein the transforming the job profile data from the common format uses the job profile object, send the job profile data in the target format to the target application, and add a custom data element to the job profile class by retrieving a data definition schema associated with the job profile class, wherein the data definition schema comprises the custom data element, retrieving a custom data schema for custom data of a pre-defined type, locating a tag related to the custom data in the custom data schema, and adding the custom data element to the tag.

12. The system of claim 11, wherein the set of instructions is further configured to cause the processor to:

define the job profile class.

13. The system of claim 11, wherein the custom data element of the job profile class is associated with at least one data field specific to the source application.

14. The system of claim 11, wherein the set of instructions is further configured to cause the processor to:

initialize data elements of the job profile object.

15. An apparatus comprising:

a processor;

means for storing a business process, wherein the business process is an executable program, the business process is configured to control a plurality of business applications, and the plurality of business applications includes at least one of a source application or a target application;

means for data transformation, wherein the means for data transformation is coupled to the processor, and the means for data transformation comprises means for receiving job profile data, wherein the job profile data is received from the source application, and the job profile data is received in a source format, means for transforming the job profile data from the source format into a common format, wherein the means for receiving is coupled to the means for transforming the job profile data, the means for transforming the job profile data into the common format uses a job profile object, the common format is defined by a job profile class, the job profile class is configured to represent a job profile, and identify a set of relationships between the job profile and a plurality of entities, the entities are related to the job profile, and the means for transforming the job profile data into the common format comprises
    means for creating the job profile object by instantiating the job profile class, and
    means for invoking a function of the job profile object in accordance with the business process;
means for transforming the job profile data from the common format into a target format of the target application, wherein the means for transforming the job profile data from the common format is coupled to the means for transforming the job profile data into the common format, and
    the means for transforming the job profile data from the common format uses the job profile object;
means for sending the job profile data in the target format to the target application,
wherein
    the means for sending is coupled to the means for transforming the job profile data from the common format into the target format of the target application; and
means for adding a custom data element to the job profile class, wherein the means for adding comprises
    retrieving a data definition schema associated with the job profile class, wherein
        the data definition schema comprises the custom data element,
    retrieving a custom data schema for custom data of a pre-defined type,
    locating a tag related to the custom data in the custom data schema, and
    adding the custom data element to the tag.

16. The apparatus of claim 15, wherein the custom data element of the job profile class is associated with at least one data field specific to the source application.

17. The apparatus of claim 15, further comprising:
    means for initializing data elements of the instantiated job profile class, wherein the means for initializing is coupled to the means for creating and the first means for transforming.

* * * * *

UNITED STATES PATENT AND TRADEMARK OFFICE
CERTIFICATE OF CORRECTION

| | | |
|---|---|---|
| PATENT NO. | : 8,112,296 B2 | |
| APPLICATION NO. | : 10/851310 | |
| DATED | : February 7, 2012 | |
| INVENTOR(S) | : Muralitharan et al. | |

It is certified that error appears in the above-identified patent and that said Letters Patent is hereby corrected as shown below:

On Title Page 2, item (56); in column 2, under "Other Publications", line 41, delete "Conventry:" and insert -- Coventry: --, therefor.

In column 3, line 27, before "(HRM) system," delete "System".

Signed and Sealed this
First Day of May, 2012

David J. Kappos
*Director of the United States Patent and Trademark Office*